Nov. 28, 1939.  J. H. K. McCOLLUM ET AL  2,181,491
VACUUM POWER CLUTCH
Original Filed Jan. 17, 1931
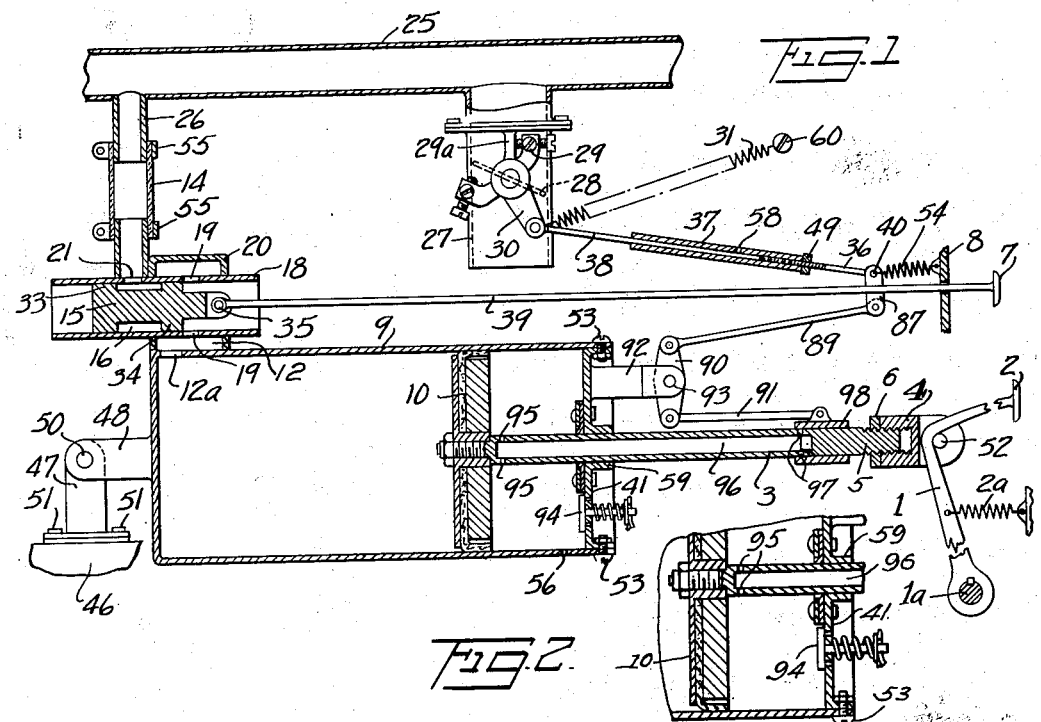
INVENTORS
Henry J. DeN. McCollum
James H. K. McCollum
By A. Parker Smith
ATTORNEY Patented Nov. 28, 1939

2,181,491

UNITED STATES PATENT OFFICE 2,181,491

VACUUM POWER CLUTCH

James H. K. McCollum and Henry J. De N. McCollum, Long Branch, N. J.

Original application January 17, 1931, Serial No. 509,310. Divided and this application January 21, 1932, Serial No. 587,880

13 Claims. (Cl. 192—.01)

Our invention relates to improvements in vacuum power clutches and the objects of our improvements are, first, to provide an automatic power clutch mechanism which will start the motor vehicle from a standstill in a very smooth manner and without any jerking, second, to provide a power clutch mechanism which will allow of gradual and smooth acceleration in all speeds and gears, third, to provide a power clutch mechanism which will permit of free-wheeling, or coasting, in any gear, including reverse, and which will at the same time, allow using the engine as a brake when going down very steep grades, or at any other time and in any gear, fourth, to provide a power clutch mechanism which will allow the use of the left foot for operating the service brake while the accelerator is being operated by the right foot, thus preventing back-rolling on up-grades in the most effective manner, fifth, to provide an automatic vacuum power clutch mechanism which will permit of driving, free-wheeling, or coasting, and braking with the engine, in any gear forward or reverse without touching the clutch pedal and by the sole manipulation of the accelerator only, and to produce a two-stage clutch engaging movement which will permit a rapid initial closing movement of the clutch-actuating member until an initial engagement has been produced, and thereafter a slower movement of said member while completing said engagement. Another object is the development of a simple device by which the operation of a servomotor which opens and closes the clutch in the car transmission is made subject to step-by-step control by the operator through the accelerator.

The present application constitutes a division of our application S. N. 509,310 filed January 17, 1931, being confined to the particular embodiment of the broad invention there disclosed and claimed which involves the use of an air cushion for the production of such step-by-step control, as contradistinguished from the throttling of the inflow of air to the vacuum chamber of the pneumatic servomotor, which latter method of step-by-step control is illustrated in Figs. 3 and 4 of our said copending application S. N. 509,310.

The best forms of apparatus at present known to us embodying sundry modifications of our invention are illustrated in the accompanying sheet of drawings in which:

Fig. 1 is a diagrammatic vertical section of a power-operated clutch controlling apparatus with its attachment to certain parts of a motor car, which latter parts are shown broken away, both ends of the power cylinder being closed; and Fig. 2 is a fragmentary view showing a modification of the type of apparatus in which a leakage port 56 shown in Fig. 1 is omitted.

In the drawing like reference characters indicate like parts. In all forms of the invention here illustrated the clutch is actuated by a servomotor comprising a pneumatic cylinder containing a piston which is drawn inwardly to disengage the clutch when the interior of that end of the cylinder is connected to the intake manifold of the motor, and the clutch engagement is produced by the action of the usual clutch springs when the connection from one end of to the intake manifold has been cut off and air is allowed to enter that end of the cylinder the cylinder to equalize more or less nearly the pressures on the two sides of the piston. Such clutch closing movement is wholly or mainly controlled through regulation of the outflow of any air trapped in the other, substantially closed, end of the cylinder by means of a suitable valve operatively connected to the accelerator.

Referring to Fig. 1, the usual clutch pedal of a motor car is shown at 2, a portion of the chassis of which car is shown at 46. This pedal is mounted on the clutch lever 1, which is keyed to the clutch operating shaft 1a and normally held in a clutch engaging position by the tension of the spring 2a.

25 is a section of the intake manifold of the motor to which the combustible mixture is admitted through the carburetor 27 having a throttle valve 28 of the usual butterfly type operated by the throttle lever 30 and limited in its movements by the adjustable stop mechanism 29 co-operating with the fixed stop rib 29a. This throttle valve is normally held in nearly closed or idling position by the spring 31 anchored at 60. It can be opened by motion of the accelerator pedal 7 mounted on rod 39 projecting through foot-board 8 and having a pivotal connection at 40 to the accelerator rod 36 which has a lost motion connection to the throttle rod 38 which is pivoted to the throttle lever 30. The sleeve 37 is adjustably mounted on the end of the rod 36 by means of the screw thread connection there shown and can be locked in any position of adjustment by the lock-nut 49. Throttle rod 38 slides in this sleeve and when the accelerator pedal 7 is fully retracted by the action of spring 54, there is a gap left between the end of rod 38 and the end of the accelerator rod 36. Ports 58 admit air to this space so as to permit free movement of the parts. When the accelerator pedal 7 is forced by the operator's foot toward the left the first action will be to take up the lost motion and thereafter subsequent movement of the pedal will cause opening movement of the throttle valve.

The power mechanism or servomotor for operating the clutch shown in this figure comprises the vacuum cylinder 9 which is pivotally mounted on the chassis 46 by means of the pedestal 47 fastened to the chassis by screw bolts 51, 51, and the lug 48 projecting beyond the closed end of the cylinder and hinged or pivoted to the pedestal 47 at 50, together with the piston 10 reciprocable in said cylinder.

On the outer end of the piston rod 3 is the screw thread 5 by means of which it is adjustably connected to the fork 4 which carries the pin 52 in its open end, forming a pivotal connection with the pedal lever 1. 6 is a lock-nut on the piston rod. The left hand end of cylinder 9 is connected through port 12a to the port casing 20 mounted on the casing 18 of the double piston valve 15 and surrounding ports 19 therein. Said valve is connected by pin 35 to rod 39 so as to be reciprocable by accelerator 7. Its piston section 34 is just wide enough to lap ports 19, and its cutaway portion 16 between said piston 34 and the one 33 at its left hand end is wide enough to connect said ports 19 with another valve casing port 21 when the accelerator 7 has been put in fully retracted position by contraction of spring 54, and valve 15 thereby also moved to the right far enough to place its piston section 34 to the right of ports 19. Piston section 33 is always to the left of port 21 which is connected by conduit 26 to manifold 25. Said conduit as shown is made in two sections connected by a short length of rubber tubing 14 fastened thereto by hose clips 55, 55, so as to permit cylinder 9 to swing slightly on pivot 50. The above described balanced valve mechanism operates to admit air at atmospheric pressure to cylinder 9 when valve 15 is in any position with its piston portion 34 to the left of the right hand edges of ports 19, to subject said cylinder interior to manifold suction whenever said valve portion 34 has moved to the right of the left-hand edges of said ports, and to trap the contained air in cylinder 9 whenever said portion 34 is in position for bridging ports 19.

The middle portion of the piston rod 3 in this case is made hollow having the bore 96 connected to the right hand portion of the interior of cylinder 9 by port 95 near the piston and to the atmosphere through ports 97 near the outer end of the piston rod; ports 97 are controlled by a valve sleeve 98 sliding on the piston rod and connected by pivoted link 91, a walking beam 90, pivoted link 89 and pivot lug 87 to the valve rod 39. Walking beam 90 vibrates on a fixed pivot in fork 93, supported by housing 92, which is fixed on cylinder head 41. 94 is an inwardly opening spring-closed air valve mounted in said head 41. The slow final movement of the piston is here caused by the trapping of air in the right-hand end of the cylinder when the ports 97 in the piston rod enter sleeve 98. Thereafter the trapped air slowly escapes through the leakage port 56 in the walls of cylinder 9 near the right hand end thereof.

When the pedal 7 is in its farthest position to the right, the sleeve 37 has slid to the right on the rod 38, after the throttle closed, thus leaving a gap between the end of the rod 38 and the end of rod 36; but with the parts in the position shown the end of the rod 38 is in contact with the end of rod 36 so that the throttle is operated by any further movement of pedal 7 to the left. Holes 58 in sleeve 37 serve to prevent air locks, which might prevent quick opening of such gap.

Three-way valves 105 of any desired construction such as shown in Fig. 5 of Patent 1,858,999, granted to us May 17, 1932, can be inserted in the conduits 12 and 13 (in Fig. 1) so as to connect either or both ends of the cylinder 9 to the atmosphere continuously, and simultaneously disconnect the rest of the mechanism from said cylinder, if it is desired to run the car in the ordinary manner without using our invention, or the piping can be so arranged as to permit the use of one double three-way combination valve for these purposes.

The spring 54, yielding to a light tension, allows of an additional resistance being felt by the operator's foot resting on pedal 7 whenever the end of rod 38 comes against the end of rod 36, the added resistance of spring 31 then coming into action as the throttle of the carbureter 28 then begins to open slowly from the idling position. When this resistance is felt by the foot the operator will know that the right position of the parts for using the engine as a brake, or for running the car slowly with the carbureter in idling position, has been obtained, because this resistance can be felt by the foot without even moving the carbureter throttle valve from its idling position. In fact the best position for the parts for using the engine as a brake is just at the point where this resistance is felt by the foot, the carbureter throttle being still in an idling position.

If desired, the ports 56 can be dispensed with as indicated in Fig. 2, since there probably will be enough leakage of air passing piston 10, or around piston valve 15, to allow complete clutch closure to be ultimately effected, even if valve sleeve 98 is left in a position lapping ports 97 after a gear shifting operation has been completed and while the car is running with its throttle only slightly opened.

Also, another method of using the engine as a brake can be employed in any case; that is, the pedal 7 can be moved far enough to the left to give a rapid and full engagement of the clutch as above described, and then such pedal can be allowed to move back to the right until there occurs a reduced pressure against the operator's foot, caused by the cessation of the effective tension of the spring 31, which then can no longer be felt, thus bringing the parts into the position shown.

While the car is free wheeling at a high speed, if the parts are put into positions shown the engine, which is then idling, can be picked up, i. e. connected to the driving shaft and rear axle and brought up to a speed corresponding to that at which the car is moving, without any jar or jerk beling felt. Thereafter pedal 7 can be moved farther to the left to give the clutch its full engagement and to thereafter increase the power of the motor to any desired extent.

To satisfy the various conditions of starting, free wheeling or coasting, driving, or braking with the engine, and changing gears at various car and engine speeds, a rapid disengagement of the clutch up to a variable degree of initial engagement for the existing engine speed, and a variable rate of the completion of engagement of said clutch from the point of said initial engagement, are all necessary, and to suit these conditions we have devised the form of our invention which is shown in Fig. 1, in which a timing of the initial action of the valve which produces the change from the first to the second stage of clutch engaging movement may be effected by the operator's manipulation of accelerator pedal 7.

The mode of operation of that embodiment of our invention, the leakage port 56 being retained as there shown, is as follows: As pedal 7 is depressed to a point where the lost motion in the throttle connection has been taken up, as shown, the part of the cylinder interior to the left of the piston 10 is disconnected from the intake manifold 25 and connected to the atmosphere through the right hand open end of valve casing 18. The valve sleeve 98 has been moved into the position shown and the ports 97 in the hollow piston rod have been closed by the motion to the right of said hollow piston rod 3. Sufficient pressure has been formed in the cylinder, to the right of the piston 10, to check further movement of the piston as the air so trapped can no longer flow out through the ports 95, bore or passageway 96 and ports 97. When the piston has reached this point the clutch is partially engaged, and thereafter the leakage port 56 acts, permitting further slow movement of the piston till it closes port 56, if the accelerator 7 is held stationary. By further depressing pedal 7, an increased degree of engagement of the clutch is initially obtained as the piston 10 must move further to the right before closing the ports 97. When pedal 7 is released and retracted by spring 54, the piston valve 15 moves to the right, thus disconnecting the cylinder interior, to the left of the piston, from the atmosphere and connecting it to the intake manifold 25. The piston 10 then moving to the left to disengage the clutch forms a partial vacuum in the cylinder interior to the right of it, but said partial vacuum is released by the opening of automatic inlet valve 94 before it becomes great enough to check the piston movement, and is completely dispelled as soon as the ports 97 are opened to the atmosphere by the movement of piston rod 3 through sleeve 98 to the left.

After the clutch closing movement of piston 9 has caused it to lap leakage port 56, all further progress in clutch closure is under practically complete step-by-step control of the accelerator, there being then no escape for the air trapped in that end of cylinder 9 other than through ports 95 and 97 in the bore 96 of piston rod 3, except by possible leakage around said piston and/or piston rod.

When port 56 is omitted as indicated in Fig. 2 such step-by-step control by manipulation of the accelerator obtains throughout the entire clutch closing movement of piston 10, after ports 97 have been initially closed by sleeve valve 98, since no automatically produced second and slower stage of such piston movement can then occur while the accelerator is held stationary, such as may occur when port 56 is retained, as in Fig. 1.

The rubber hose sections 14, 14, will not collapse even under the maximum partial vacuum created in them, if made with thick walls, such as are now common in the hose used on tire pumps.

In starting the car, or in reengaging the clutch after a gear shifting operation the accelerator can be pressed down slowly until an initial clutch engagement is effected and then held stationary a moment till the follow-up action of the piston rod causes ports 97 to be closed by passing into the interior of sleeve 98, which will practically stop the clutch closure at that point if leakage port 56 has been omitted, as in Fig. 2, or if piston 10 has theretofore moved far enough to the right to have closed said port, thus avoiding jerking the car, practically simulating the action of a skillful operator when manipulating the clutch by means of pedal 2. After the car has begun to move when starting, or has increased its speed after shifting gears, the accelerator can be pressed down further, thus increasing both the amount of pressure between the clutch faces and the amount of power being delivered by the engine for transmission by the clutch, and in this way the full clutch engagement and generation of power for transmission thereby can be accomplished contemporaneously in stages, step-by-step.

If the leakage port 56 be retained, as shown in Fig. 1, and has not theretofore been closed by piston 10, by the time the clutch closing motion of the accelerator is stopped the very slow continuing outflow of air through said port will permit a very slow continued closing movement of the clutch so long as the accelerator is held stationary. Consequently the slow completion of clutch engagement (if accomplished before piston 10 closes port 56) is then effected automatically, while with the modification shown in Fig. 2 it is under absolute control of the operator from initiation to termination,—all as hereinbefore explained.

Having described our invention, we claim:

1. In an apparatus for actuating by fluid pressure a movable member of a mechanism adapted to operate a power transmitting clutch such as is employed in motor cars, the combination, with said above described apparatus, of automatic means adapted to produce a relatively rapid flow of the fluid to effect a correspondingly rapid clutch engaging movement of said clutch operating member followed by a relatively slower flow of said fluid during the final stages of said engaging movement, comprising a cylinder containing a piston and having a closed end through which the piston rod projects and is operatively connected to said movable member; said piston rod being hollow and having one air outlet port near the piston between the latter and that cylinder head through which said rod projects and another near its outer end, and means for closing said outer port.

2. A combination such as defined in claim 1 provided with means for closing said outer port comprising a sleeve on the extension of said piston rod and through which said rod normally moves as said piston travels in said cylinder.

3. A combination such as defined in claim 1 in which said automatic means comprises a cylinder containing a piston and having a closed end through which the piston rod projects and is operatively connected to said movable member; said piston rod being hollow and having one air outlet port near the piston and another near its outer end, and means for closing said outer port comprising a sleeve on the extension of said piston rod and through which said rod normally moves as said piston travels in said cylinder, said cylinder having a pemanently open air leakage port located adjacent said closed end thereof.

4. A pneumatic apparatus for actuating a movable member of a mechanism adapted to operate the power transmission clutch of a motor car, comprising, in combination, a cylinder closed at both ends but connected to the intake manifold of the car motor at one end and having a piston with a hollow piston rod projecting through the other end, said hollow piston rod having one port near said piston and another near its outer end, a valve controlling said intake manifold connection and capable of movement beyond its initial closing position, a sleeve on the exterior of said piston rod and through which said outer ported portion of said rod is movable, mechanism connecting said valve and sleeve and adapted to cause said sleeve to move farther away from said cylinder as said valve in the intake manifold connection is moved beyond its initial closing position; whereby, on any outstroke of said piston following the closure of said manifold connection said outer piston rod port is closed at a predetermined point and air thereby trapped in that end of said cylinder, but, on a further movement of said valve in the direction which produced said initial closure, said piston rod port is reopened and further escape of air therethrough from the cylinder is permitted until it is again closed by further resultant movement of the piston and piston rod.

5. In a pneumatically actuated apparatus for operating the clutch lever of a motor car comprising spring means for moving said lever into a position producing clutch engagement, a cylinder closed at one end except for a port through which air may be admitted to and withdrawn from it, and means for so admitting air therethrough, together with a piston in said cylinder and a closure for the other end thereof toward which end said piston moves to produce said clutch engaging movement of said lever, the combination, with said above described apparatus, of a piston rod connecting said piston and said lever, extending through said closure and having a passage extending lengthwise thereof for permitting the escape of air from that end of such cylinder, and manually adjustable means for preventing further escape of air when said piston movement has reached a point producing a selected degree of clutch closure.

6. A combination such as defined in claim 5 in which said passage extends through the interior of said piston rod, but has an opening at either end.

7. In an apparatus of the class described, a servo-motor operable by fluid pressure and comprising a cylinder closed at one end, a piston reciprocable in said cylinder, and a piston rod rigidly fastened to said piston and projecting through said closed cylinder end, combined with a movable clutch-controlling member to which the projecting end of said piston rod is connected; said piston rod having a passageway extending longitudinally of its interior, one end of which passageway is in constant communication with that portion of said cylinder interior between its said closed end and said piston, while the other end of said passageway has an opening to the atmosphere during the first portion only of the clutch-engaging movement of said piston.

8. In an apparatus of the class described, a servo-motor operable by fluid pressure and comprising a cylinder closed at one end, a single, imperforate piston reciprocable in said cylinder, and a piston rod rigidly fastened to said piston and projecting through said closed cylinder end, combined with a movable clutch-controlling member to which the projecting end of said piston rod is connected; said piston rod having a passageway extending longitudinally of its interior, one end of which passageway is in constant communication with that portion of said cylinder interior between its said closed end and said piston, while the other end of said passageway has an opening to the atmosphere during the first portion only of the clutch-engaging movement of said piston; together with means for automatically closing said opening to the atmosphere during a subsequent portion of said clutch-closing movement of said piston.

9. In a servomotor for opening and closing the clutch of a motor car comprising a cylinder with closure heads at both ends, a piston reciprocable therein, and a conduit opening into the cylinder interior through one of said heads adapted for exhausting air therefrom, the combination of a hollow cylindrical piston rod of uniform external diameter extending from said piston through the other of said heads having a substantially airtight, sliding bearing therein and a port connecting its bore with the interior of that end of said cylinder, with means for operatively connecting the projecting portion of said piston rod with a clutch actuating member, and manually adjustable means for controlling the flow of air through said port.

10. A combination such as defined in claim 9 in which said manually adjustable means comprises valve mechanism and a device for adjusting the position of a movable element thereof adapted to be operatively connected to the accelerator of any car on which such servomotor may be installed.

11. A combination such as defined in claim 9 in which said piston rod bore is closed at its outer end except for a port through its side walls located exteriorly of the adjacent cylinder head, and in which said manually adjustable means comprises a valve sleeve fitting closely on said piston rod and adapted to open or close said port by virtue of proper relative reciprocation between them.

12. In an apparatus of the class described, a servo-motor operable by fluid pressure and comprising a cylinder closed at one end, a piston reciprocable in said cylinder, and a piston rod rigidly fastened to said piston and projecting through said closed end, combined with a movable clutch-controlling member to which the projecting end of said piston rod is connected; said piston rod having a passageway extending longitudinally of its interior, provided with an opening through its wall near one of its ends so located as to remain always within said closed cylinder end during substantially the entire of the normal reciprocating motion of said piston, while the other end of said passageway has an opening to the atmosphere.

13. In an apparatus of the class described, a servo-motor operable by fluid pressure and comprising a cylinder closed at one end, a piston reciprocable in said cylinder, and a piston rod rigidly fastened to said piston and projecting through said closed end, combined with a movable clutch-controlling member to which the projecting end of said piston rod is connected; said piston rod having a passageway extending longitudinally of its interior, provided with an opening through its wall near one of its ends so located as to remain always within said closed cylinder end during a major portion at least of the normal reciprocating motion of said piston, while the other end of said passageway has an opening to the atmosphere, together with manually adjustable means for controlling the flow of air through said passageway.

HENRY J. DE N. McCOLLUM.
JAMES H. K. McCOLLUM.